United States Patent
Shiao et al.

(10) Patent No.: US 10,315,385 B2
(45) Date of Patent: Jun. 11, 2019

(54) SYSTEM, METHOD AND APPARATUS FOR INCREASING SURFACE SOLAR REFLECTANCE OF ROOFING

(75) Inventors: Ming Liang Shiao, Collegeville, PA (US); Husnu M. Kalkanoglu, Swarthmore, PA (US); George Wattman, Malvern, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 936 days.

(21) Appl. No.: 13/558,034

(22) Filed: Jul. 25, 2012

(65) Prior Publication Data

US 2013/0034697 A1 Feb. 7, 2013

Related U.S. Application Data

(60) Provisional application No. 61/515,391, filed on Aug. 5, 2011.

(51) Int. Cl.
*B32B 11/02* (2006.01)
*B32B 27/40* (2006.01)
(Continued)

(52) U.S. Cl.
CPC ............... *B32B 11/02* (2013.01); *B32B 5/16* (2013.01); *B32B 27/308* (2013.01); *B32B 27/36* (2013.01); *B32B 27/38* (2013.01); *B32B 27/40* (2013.01); *E04D 5/12* (2013.01); *B05D 2252/02* (2013.01); *B05D 2401/32* (2013.01); *B05D 2451/00* (2013.01); *B32B 2419/06* (2013.01); *Y02B 80/34* (2013.01); *Y10T 428/2443* (2015.01);
(Continued)

(58) Field of Classification Search
CPC .......... B32B 11/02; B32B 37/24; E04D 5/12; E04D 1/20; E04D 1/28; E04D 2001/005; Y02B 80/34; B05D 2252/02; B05D 2401/32; B05D 2451/00; B05D 2425/01
See application file for complete search history.

(56) References Cited

U.S. PATENT DOCUMENTS

| 1,969,074 A | 8/1934 | Harshberger |
| 2,197,895 A | 6/1936 | Nichols |
(Continued)

FOREIGN PATENT DOCUMENTS

| DE | 2018304 A1 | 2/1972 |
| DE | 9405349 U1 | 6/1994 |
(Continued)

OTHER PUBLICATIONS

U.S. Appl. No. 13/629,282, filed Sep. 27, 2012, Inventors: Rosiana Aguiar et al.
(Continued)

*Primary Examiner* — Nathan L Van Sell
(74) *Attorney, Agent, or Firm* — Abel Schillinger, LLP; Thomas H Osborn

(57) ABSTRACT

A roofing product has a substrate having a binder layer and roofing granules on a majority of the binder layer, such that an exposed portion of the binder layer does not have the roofing granules. In addition, reflective particles may be located on the exposed portion of the binder layer. The reflective particles are smaller in size than the roofing granules, and the reflective particles have a solar reflectance of greater than 40%.

10 Claims, 6 Drawing Sheets

(51) Int. Cl.
  *B32B 27/38* (2006.01)
  *B32B 27/36* (2006.01)
  *B32B 27/30* (2006.01)
  *B32B 5/16* (2006.01)
  *E04D 5/12* (2006.01)

(52) U.S. Cl.
  CPC .......... *Y10T 428/24372* (2015.01); *Y10T 428/24405* (2015.01); *Y10T 428/24413* (2015.01); *Y10T 428/24421* (2015.01)

(56) References Cited

U.S. PATENT DOCUMENTS

| | | |
|---|---|---|
| 2,046,295 A | 4/1940 | Nichols |
| 2,202,002 A | 5/1940 | Harshberger et al. |
| 2,234,446 A | 3/1941 | Murphy |
| 2,294,930 A | 9/1942 | Palmquist |
| 2,321,674 A | 6/1943 | Harshberger et al. |
| 2,332,220 A | 10/1943 | Harshberger |
| 2,332,221 A | 10/1943 | Harshberger |
| 2,378,927 A | 6/1945 | Jewett |
| 2,569,134 A | 9/1951 | Reed |
| 2,695,851 A | 11/1954 | Lodge |
| 2,729,574 A | 1/1956 | Schwarz |
| 2,732,311 A | 1/1956 | Hartwright |
| 2,749,250 A | 6/1956 | Christensen et al. |
| 3,001,331 A | 6/1959 | Brunton |
| 2,951,770 A | 9/1960 | Lodge et al. |
| 3,169,075 A | 2/1965 | Morrow et al. |
| 3,207,619 A | 9/1965 | Klimboff |
| 3,216,883 A | 11/1965 | Bick et al. |
| 3,288,618 A | 11/1966 | De Vries |
| 3,291,011 A | 12/1966 | Defregger et al. |
| 3,707,432 A | 12/1972 | Corbin |
| 3,964,820 A | 6/1976 | Eigenmann |
| 3,964,920 A | 6/1976 | Eigenmann |
| 4,020,211 A | 4/1977 | Eigenmann |
| 4,478,869 A | 10/1984 | Brady et al. |
| 4,717,614 A | 1/1988 | Bondoc et al. |
| 4,749,731 A | 6/1988 | Kyminas et al. |
| 5,053,253 A | 10/1991 | Haenggi et al. |
| 5,124,178 A | 6/1992 | Haenggi et al. |
| 5,206,068 A | 4/1993 | Kalkanoglu |
| 5,283,080 A | 2/1994 | Lamb et al. |
| 5,286,682 A | 2/1994 | Jacobs et al. |
| 5,338,368 A | 8/1994 | Fletcher et al. |
| 5,380,552 A | 1/1995 | George et al. |
| 5,571,596 A | 11/1996 | Johnson |
| 5,941,655 A | 8/1999 | Jacobs et al. |
| 6,326,053 B1 | 12/2001 | Stump et al. |
| 6,479,132 B2 | 11/2002 | Hedblom et al. |
| 6,544,598 B1 | 4/2003 | Swei et al. |
| 6,569,520 B1 | 5/2003 | Jacobs |
| 6,878,666 B2 | 4/2005 | Domen et al. |
| 6,881,483 B2 | 4/2005 | McArdle et al. |
| 6,933,007 B2 | 8/2005 | Fensel et al. |
| 7,125,601 B1 | 10/2006 | Pinault et al. |
| 7,238,408 B2 | 7/2007 | Aschenbeck et al. |
| 7,241,500 B2 | 7/2007 | Shiao et al. |
| 7,291,358 B1 | 11/2007 | Fensel et al. |
| 7,452,598 B2 | 11/2008 | Shiao et al. |
| 7,503,971 B2 | 3/2009 | Wojtysiak |
| 7,592,066 B2 | 9/2009 | Shiao et al. |
| 7,615,512 B2 | 11/2009 | Orth-Gerber et al. |
| 7,846,548 B2 | 12/2010 | Shiao et al. |
| 8,435,599 B1 | 5/2013 | Standeford et al. |
| 8,993,047 B2 | 3/2015 | Standeford et al. |
| 2002/0066233 A1 | 6/2002 | McArdle et al. |
| 2002/0160151 A1 | 10/2002 | Pinault et al. |
| 2002/0169076 A1 | 11/2002 | Takeshi et al. |
| 2003/0059528 A1 | 3/2003 | Swei et al. |
| 2003/0152747 A1 | 8/2003 | Fensel |
| 2004/0071938 A1 | 4/2004 | Fensel |
| 2005/0072110 A1 | 4/2005 | Shiao et al. |
| 2005/0238848 A1 | 10/2005 | Fensel |
| 2006/0159609 A1 | 7/2006 | Gole |
| 2006/0251807 A1 | 11/2006 | Hong et al. |
| 2007/0107372 A1 | 5/2007 | Harrington, Jr. |
| 2007/0110961 A1 | 5/2007 | Fensel et al. |
| 2008/0031832 A1 | 2/2008 | Wakefield et al. |
| 2008/0241472 A1 | 10/2008 | Shiao et al. |
| 2008/0248242 A1 | 10/2008 | Shiao et al. |
| 2010/0047566 A1 | 2/2010 | Viasnoff et al. |
| 2010/0151199 A1* | 6/2010 | Shiao et al. .......... 428/144 |
| 2010/0190633 A1 | 7/2010 | Bai et al. |
| 2011/0052874 A1 | 3/2011 | Zhou et al. |
| 2011/0086201 A1 | 4/2011 | Shiao et al. |
| 2011/0183112 A1 | 7/2011 | Bailey et al. |

FOREIGN PATENT DOCUMENTS

| | | |
|---|---|---|
| EP | 0901547 A1 | 3/1999 |
| GB | 255477 | 4/1927 |
| GB | 672683 | 5/1952 |
| GB | 905988 | 9/1962 |
| GB | 1234071 | 6/1971 |
| GB | 1316444 A | 5/1973 |
| GB | 1362439 | 8/1974 |
| GB | 559261 | 2/1994 |
| JP | 200148586 | 2/2001 |
| JP | 2006001820 A | 1/2006 |
| WO | 9745607 A1 | 12/1997 |
| WO | 0171121 | 9/2001 |
| WO | 0173242 A1 | 10/2001 |

OTHER PUBLICATIONS

U.S. Appl. No. 13/101,838, filed May 5, 2012, Inventors: Rosiana Aguiar et al.

U.S. Appl. No. 13/841,401, filed Mar. 15, 2013, Inventors: Ming Liang Shiao et al.

Palanivelu et al. (Carbon Doping of TiO2 for Visible Light Photo Catalysis—A review, Carbon Science vol. 8, No. 3, Sep. 2007, pp. 214-224).

* cited by examiner

Control with no filling of reflective particles    Embodiment with filling of reflective particles Control with no filling of reflective particles    Embodiment with filling of reflective particles

SYSTEM, METHOD AND APPARATUS FOR INCREASING SURFACE SOLAR REFLECTANCE OF ROOFING

This application claims priority to and the benefit of U.S. Prov. Pat. App. No. 61/515,391, filed Aug. 5, 2011, and is incorporated herein by reference in its entirety.

BACKGROUND OF THE INVENTION

1. Field of the Disclosure

The present invention relates in general to roofing and, in particular, to a system, method and apparatus for increasing the surface solar reflectance of roofing shingles.

2. Related Art

It has been shown that surfaces of man-made structures, such as a roofing covering, cladding, or pavement surface, can absorb significant amounts of solar radiation. This causes the so-called "heat island effect," where the temperatures in an urban area tend to be several degrees higher than surrounding areas. As a result, significant amounts of solar heat flux can be absorbed due to those surfaces with low solar reflectivity, particularly on hot summer days. This not only increases the demand for indoor cooling energy, but also contributes to smog formation due to higher surface temperatures. Hence, it is beneficial to have a surface with increased solar reflectance to reduce solar heat gain thereby reducing the heat flux entering building envelopes or reducing surface temperatures for lowering smog formation.

This effect is particularly true for mineral-surfaced bitumen roofing products, such as those described in ASTM D225 and D3462. The bitumen or asphalt-based roof coverings are generally constructed from asphalt-saturated roofing felts and surfaced by pigmented color granules, such as those described in U.S. Pat. No. 4,717,614. However, such roofing granules and the resultant roofing membranes or asphalt shingles are known to have low solar reflectivity and hence will absorb solar heat especially through the near infrared range of the solar spectrum. As a result, it is common to measure temperatures as high as 160 to 170° F. on the surfaces of dark roofing shingles on a sunny day with 80° F. ambient temperatures. In recent years, there have been mineral particle surfaced, asphaltic roofing products that are designed to reduce solar heat absorption. This has been achieved by coloring the surface mineral particles with solar reflective colorants. However, the mineral particles typically cover only about 80% to 95% of the shingle surface. The remaining uncovered area of shingles can still absorb significant amounts of solar radiation. As a result, this exposed, highly absorbing asphalt surface can reduce the total solar reflectance by as much as 20%.

Hence, it would be desirable to have a mineral-surfaced roofing product with an exposed asphalt area that can be covered by reflective media that can fit in between the mineral particles. It would also be desirable to have a process wherein the reflective media can be efficiently deposited onto the exposed asphalt area without affecting granule adhesion or the overall aesthetics of the shingles.

SUMMARY

Embodiments of a roofing product may comprise a substrate having a binder layer and roofing granules on a majority of the binder layer, such that an exposed portion of the binder layer does not have the roofing granules. In addition, reflective particles may be located on the exposed portion of the binder layer. The reflective particles are smaller in size than the roofing granules, and the reflective particles have a solar reflectance of greater than 40%.

In another embodiment, a method of fabricating a roofing product may include coating a substrate with a binder layer, depositing roofing granules on the binder layer of the substrate, and pressing the roofing granules into the binder layer, such that an exposed portion of the binder layer is not covered by the roofing granules to form a subassembly.

In addition, the method may include turning the subassembly on a roller such that the subassembly is curved and spaces between the roofing granules are widened, and depositing reflective particles on the widened spaces of the exposed portion of the binder layer, and the reflective particles are smaller than the roofing granules.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and may be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

To improve the total solar reflectance of a mineral particle surfaced roofing product (e.g., a roofing shingle, roofing membrane, or the like), embodiments of a system, method and apparatus are disclosed by which the exposed portion of asphalt surface is substantially covered by reflective particles to increase the solar reflectivity. The shingle is typically made by coating a reinforcement layer followed by deposition of the surfacing mineral particles and pressing the particles to achieve a desirable surface appearance and adhesion.

Figure 1A:
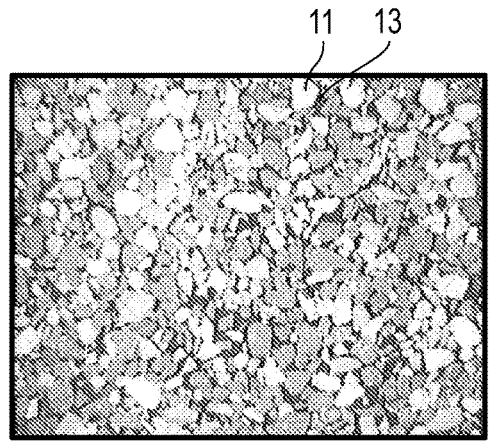
FIGS. 1A and B are top and image analysis views of a conventional roofing shingle.
Figure 1B:
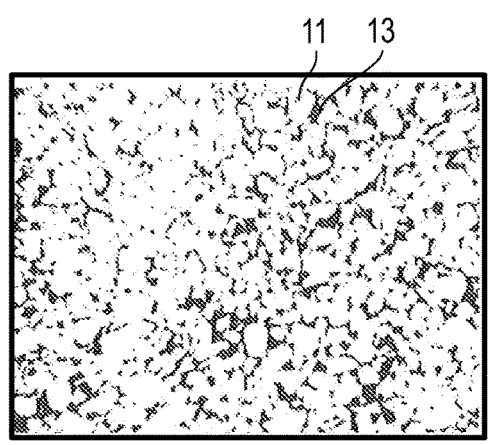
Figure 2A:
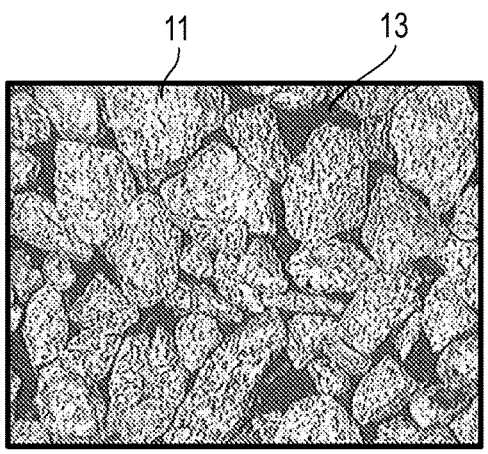
FIGS. 2A and B are enlarged top and image analysis views of another conventional roofing shingle.
Figure 2B:
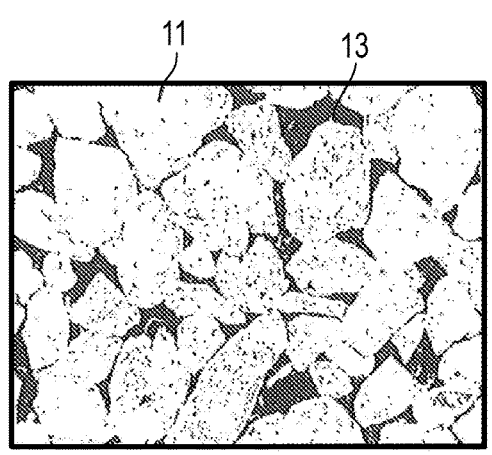

Conventional roofing granules typically cover about 80% to 95% of the surface of a roofing shingle. For example, in the image analysis via digitized micrograph depicted in FIGS. 1 and 2, roofing granules 11 cover most of the underlying bitumen coating or layer 13, which appears as uncovered black patches 13 in FIGS. 1B and 2B.

To cover the remaining exposed portion of the asphalt surface and to improve the overall solar reflectance, a layer of reflective particles 15 (FIG. 3C) is deposited on the exposed portion 13 on the underlying substrate 17, such as a fibrous web. In some embodiments, this step takes place after the deposition of the primary surfacing mineral granules 11, and while the asphalt substrate is sufficiently hot to remain soft and tacky. In another embodiment, deposition of the reflective particles for covering the exposed asphalt surface occurs before the pressing of the primary surfacing mineral particles and before the onset of cooling water.

Figure 3A:
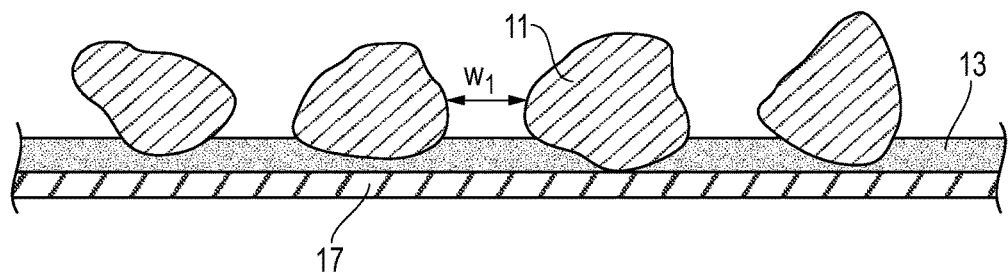
FIGS. 3A-3C are schematic sectional side views of an embodiment of a method of forming a roofing product.
Figure 3B:
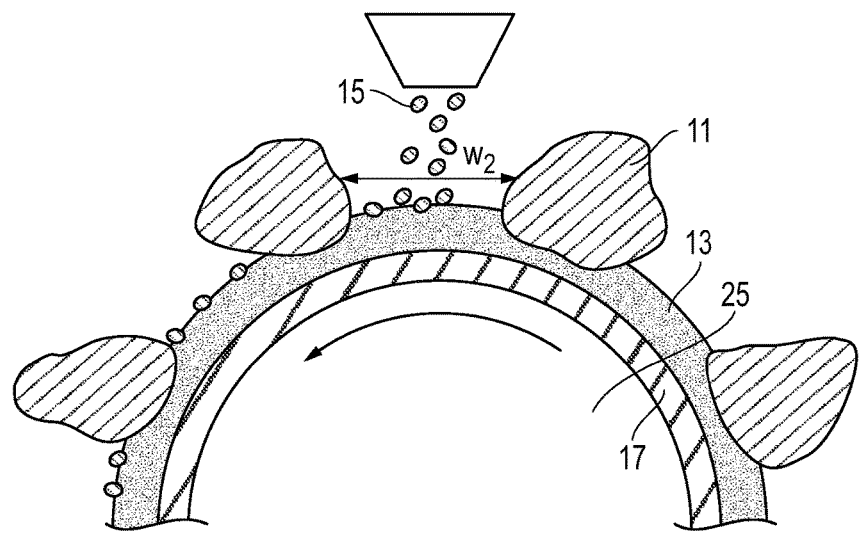
Figure 3C:
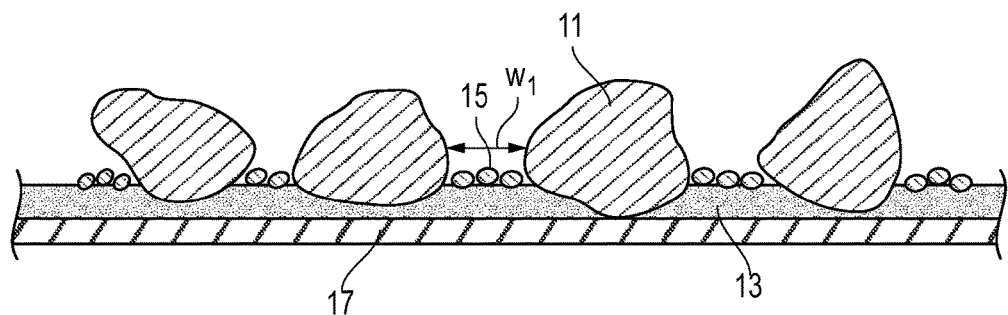

Embodiments of a method of forming a roofing product may include providing the coated substrate 13, 17 with granules 11 (FIG. 3A) in a substantially flat configuration, such that the granules 11 are generally separated by nominal distances or widths $w_1$. The widths between granules 11 are not uniform. Widths $w_1$ are merely representative of the relative spaces between adjacent granules. The coated substrate 13, 17 is subsequently turned (FIGS. 3B, 5B and 5C) on a cylindrical roller 25. The schematic view in FIG. 3B is greatly exaggerated for illustration purposes. While on the roller, the granules 11 are temporarily further separated by widths $w_2$ that exceed widths $w_1$ due to the radius of curvature of the underlying roller 25. The reflective particles 15 may be added to the subassembly at this time, such that they contact the coated substrate 13, 17 when the granules 11 are spaced at widths $w_2$. As shown in FIG. 3C, the final assembly is subsequently returned to a substantially flat configuration wherein the granules 11 are again separated by their nominal widths $w_1$.

Suitable materials for covering the exposed asphalt surface may comprise a desirable particle size range and desirable solar reflectance. The reflective particles may have particle sizes that can fit into the gap between the primary surfacing mineral particles. For example, the particles may have a particle size less than US mesh #30. In other embodiments, the particles may have a particle size less than US mesh #50, or between US mesh #30 and #80. The particle also may have a solar reflectance of greater than 40%, and in other embodiments greater than 70%.

Examples of suitable materials for the reflective particles may comprise crushed quartz granules, crushed calcites, ceramic particles, crushed ceramic grog, sintered clay particles, $TiO_2$ particles, IR reflective pigments, calcined clays, zinc oxide particles, reflective polymer particles, reflective glass spheres, retro-reflective glass beads, reflective mica or thin film coated mica, heat reflective particles, metal flakes, particles or spheres, colored mineral particles, and/or any naturally occurring reflective particles with sufficient reflectivity.

Figure 4:
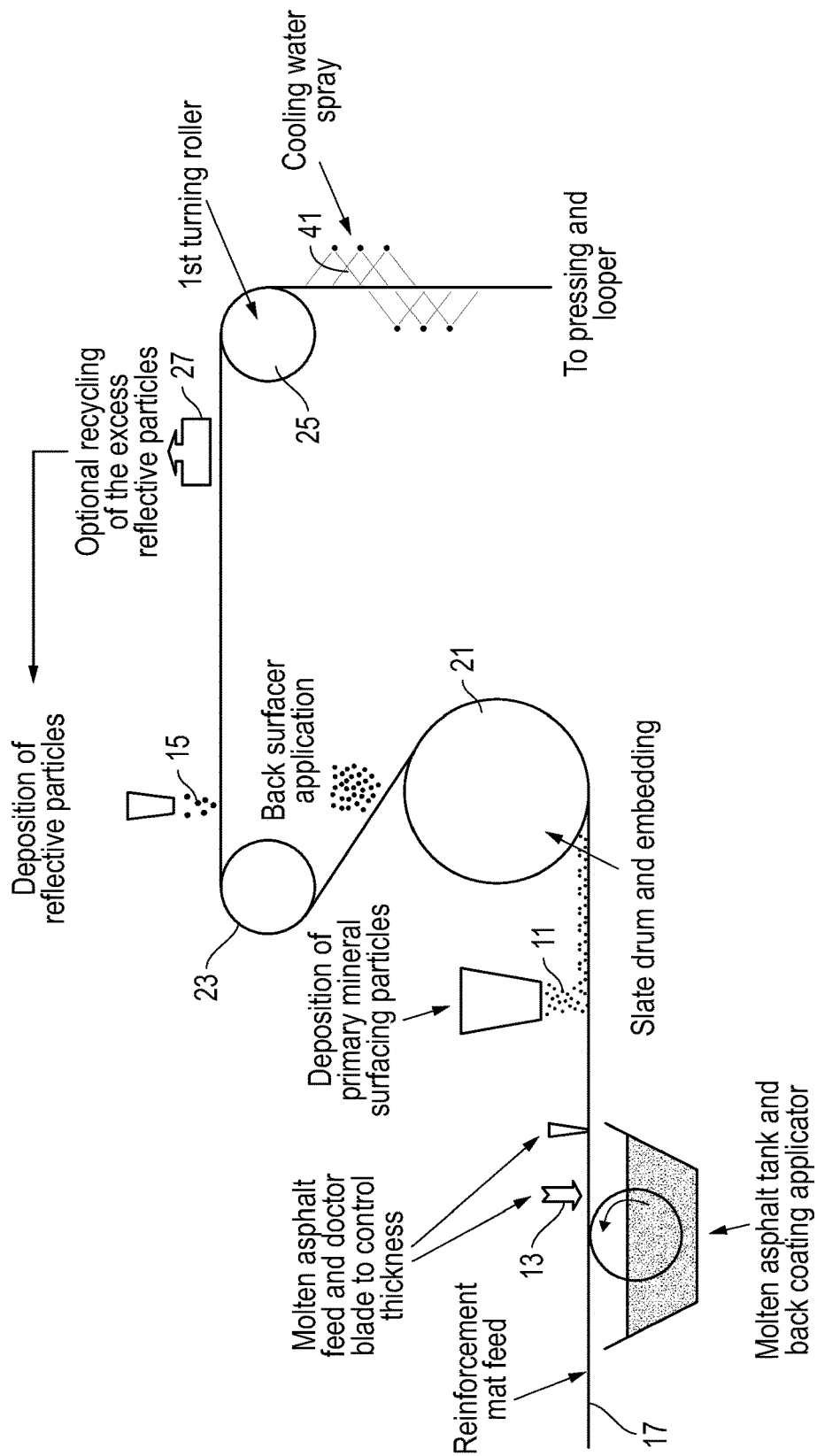
FIGS. 4-6 are schematic diagrams of embodiments of methods of producing roofing products.

In some embodiments, the reflective particles may be deposited via gravity feed over the web of the asphalt product during the manufacturing of the product. The deposition may be carried out after dropping the primary surfacing mineral particles and before the pressing of the primary surfacing particles. An example of the deposition is depicted in FIG. 4, where the reflective particles 15 are deposited after the web 17 goes around the slate drum 21 and roll 23, and before the first turning roller 25, where the granulated surface is facing upward.

Figure 5A:
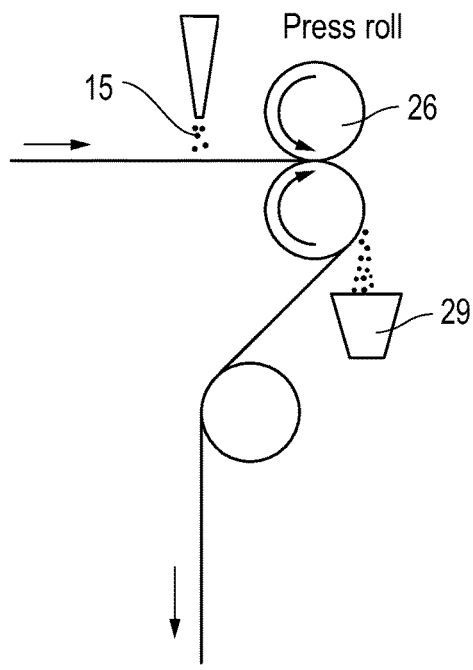
Figure 5B:
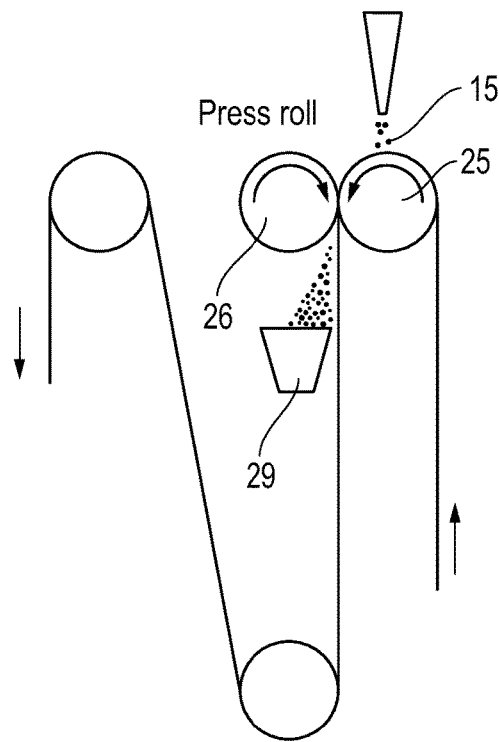
Figure 5C:
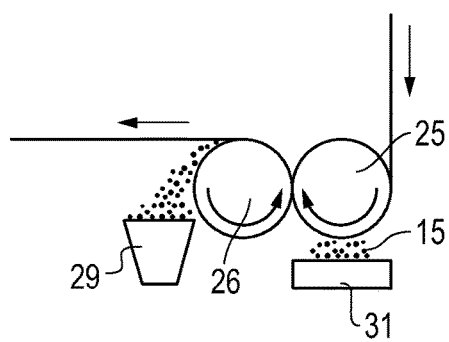

The particle sizes for this application method may range from less than US mesh #30 to larger than #100 U.S. mesh to avoid dusting or air borne particle problems. Referring now to FIGS. 4 and 5, a particle recovering system (e.g., vacuum pickup 27 or catch pan 29 after one or more of the turning or press rollers 26) may be employed after the deposition of the reflective particles 15. This allows for recycling the particles and removes excess, unbonded particles to avoid forming a slippery surface on the shingles due to loose particles on their surfaces.

Embodiments of the reflective particles 15 selected for covering the exposed asphalt surface should have good hiding power when deposited as a mono-layer or thin layer on that surface. This is to ensure that the resultant shingle or membrane provides improved solar reflectance by avoiding heat absorption by the asphalt surface. Embodiments of the reflective particles may have an opacity greater than 50%, and/or the CIE color unit L*>50, when deposited as a layer thickness of, for example, 20 mil (500 microns) or less over a substantially black background.

Figure 6:
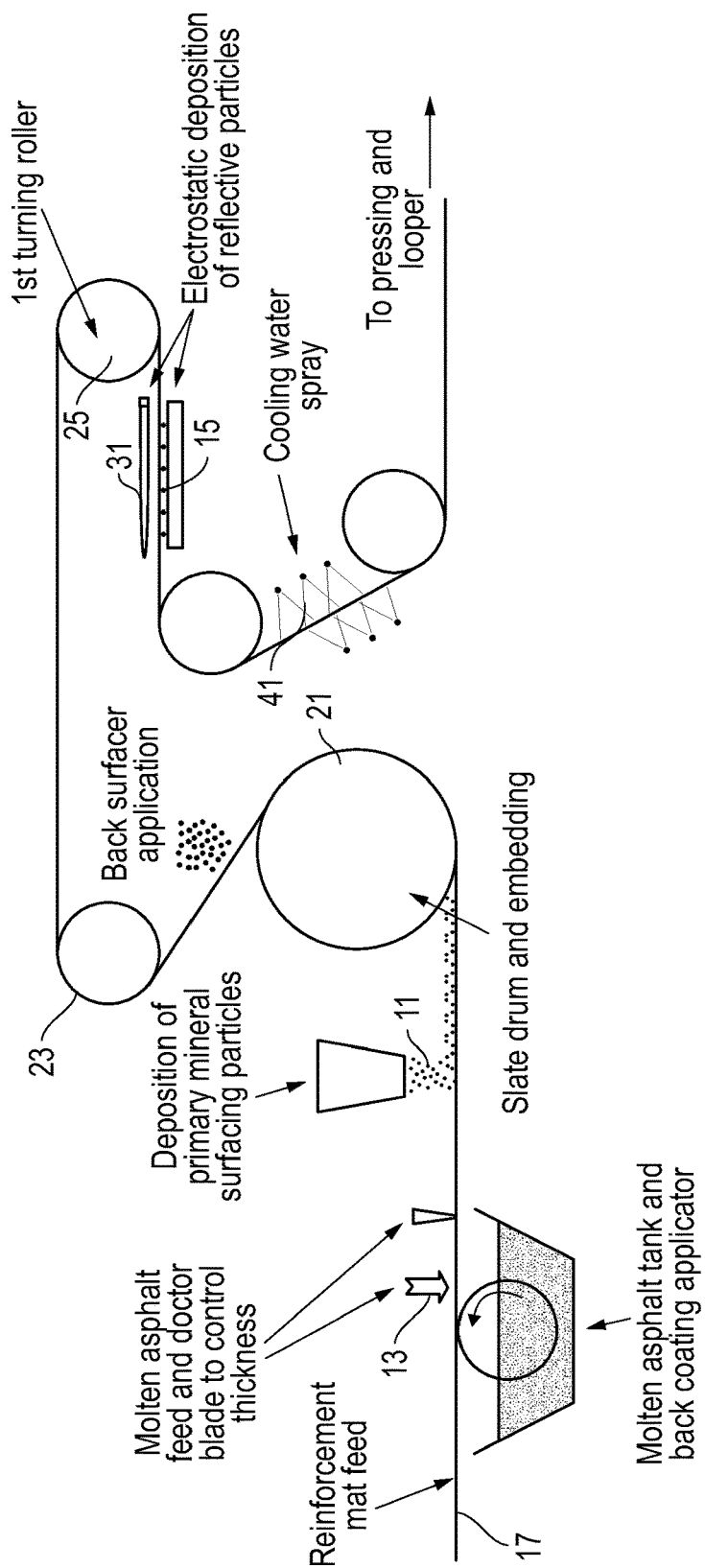

In still other embodiments (FIGS. 5C and 6), the reflective particles 15 may be deposited by an electrostatic deposition process 31. The particles 15 may be energized by electrostatic charge and then attracted to the web 17 of the asphalt product 13 by electrostatic force to complete the deposition process. This process has been used in the bonded abrasive industry and an example is disclosed in U.S. Pat. No. 6,544,598, to Swei, et al, which is incorporated herein by reference in its entirety. For this deposition process, the reflective particles 15 may be deposited after dropping the primary surfacing mineral particles 11, and the bitumen layer 13 of the web 17 of the granulated side faces downward to have the charged reflective particles 15 drawn upward toward the web.

Other embodiments of the reflective particles may be deposited by dispersing them in a liquid media and then spraying the media onto the surface of the web after dropping the primary mineral surfacing particles, as shown and described herein. Suitable liquid media may include, but not be limited to, water, latex, acrylic emulsions, and/or solvent-based coatings. The liquid media may further comprise other additives, such as dispersants, viscosity modifiers, and/or biocides. The reflective particles may be first dispersed in the liquid media via mixing or shearing, and then the mixture may be pumped to a nozzle to be sprayed directly onto the surface of the web of the roofing product. This allows the reflective particles to stick to the surface and also be carried by water or liquid media to the valley or low point of the asphalt surface in between the granules. This deposition may be carried out before the first cooling water spray 41 (FIGS. 4 and 5) during the manufacturing of the roofing product.

In further embodiments, the reflective particles may comprise other components and functionalities, such as algaecides, fungicides, biocides, UV blocking, color, and/or metallic appearance. Still other examples of this disclosure will become apparent to those who are skilled in the art. For example, the reflective particles may comprise zinc oxide, which combines solar reflectance with algae resistance.

The roofing granules may have a wide range of colors including beige, yellow, green, brown, dark gray, and potentially other colors while still having a desired reflectivity and emissivity. The roofing granules may comprise suitable particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled manufactured materials such as crushed bricks, concrete, porcelain, fire clay, and the like.

EXAMPLE 1

Samples of modified bitumen membrane (e.g., Flinlastic GTA cap sheet, available from CertainTeed Corp., Little Rock, Ark.) with Energy Star rated solar reflectance of 65% were filled with two types of reflective particles to cover the exposed asphalt between roofing granules. A bitumen membrane sample of size 12"×12" was first heated in a forced-air oven to 80° C. to simulate the product temperature during the manufacturing of the membrane prior to press rolls. In one example, about 10 g of reflective particles of ceramic grog (e.g., 90A from Maryland Refractory, Irondale, Ohio) having solar reflectance >70%, and a size of passing #40 mesh were sprinkled onto the sheet, and then pressed by a 20 lb roller to press them into the gap in between the granules. The sample was then flipped over to remove excess particles. In the same manner, a second sample was prepared by filling the gaps with white colored quartz sand (e.g., SpectraQuartz available from Fairmount Minerals, Chardon, Ohio). The results are shown in Table 1. The solar reflectance of the control or unfilled sample was increased by filling the gap between the granules.

TABLE 1

|  | Control | Sample A | Sample B |
| --- | --- | --- | --- |
| Reflective Particle Media | none | ceramic grog | quartz sand |
| Amount Added | — | 3.74 g | 4.43 g |
| Solar Reflectance reading #1 | 0.65 | 0.675 | 0.668 |
| Solar Reflectance reading #2 | 0.639 | 0.673 | 0.667 |
| Solar Reflectance reading #3 | 0.638 | 0.681 | 0.68 |
| Solar Reflectance reading #4 | 0.663 | 0.667 | 0.677 |
| Solar Reflectance reading #5 | 0.645 | 0.667 | 0.663 |
| Solar Reflectance reading #6 | 0.643 | 0.665 | 0.69 |
| Solar Reflectance reading #7 | 0.649 | 0.681 | 0.685 |
| Solar Reflectance reading #8 | 0.629 | 0.673 | 0.686 |
| Solar Reflectance reading #9 | 0.637 | 0.663 | 0.683 |
| Solar Reflectance reading #10 | 0.655 | 0.665 | 0.702 |
| Solar Reflectance reading #11 | 0.636 | 0.688 | 0.665 |
| Solar Reflectance reading #12 | 0.646 | 0.678 | 0.67 |
| Solar Reflectance reading #13 | 0.645 | 0.674 | 0.67 |
| Solar Reflectance reading #14 | 0.658 | 0.676 | 0.69 |
| Solar Reflectance reading #15 | 0.654 | 0.665 | 0.674 |
| Solar Reflectance reading #16 | 0.642 | 0.663 | 0.684 |
| Solar Reflectance reading #17 | 0.625 | 0.68 | 0.687 |
| Solar Reflectance reading #18 | 0.638 | 0.68 | 0.676 |
| Solar Reflectance reading #19 | 0.647 | 0.665 | 0.669 |
| Solar Reflectance reading #20 | 0.641 | 0.665 | 0.682 |
| Averaged Solar Reflectance | 0.6440 | 0.6722 | 0.6784 |

EXAMPLE 2

Figure 7:
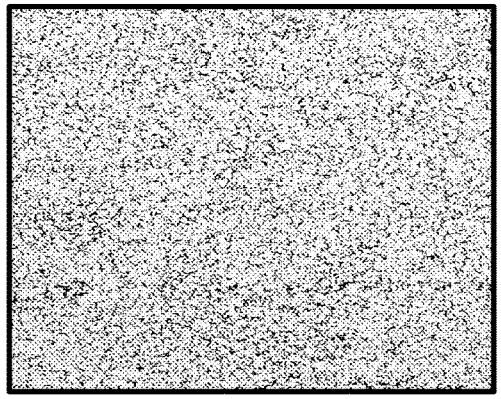
FIGS. 7 and 8 are side-by side photographs showing, on the left, conventional roofing products with no filling of reflective particles and, on the right, embodiments of a roofing product filled with reflective particles.
Figure 7:
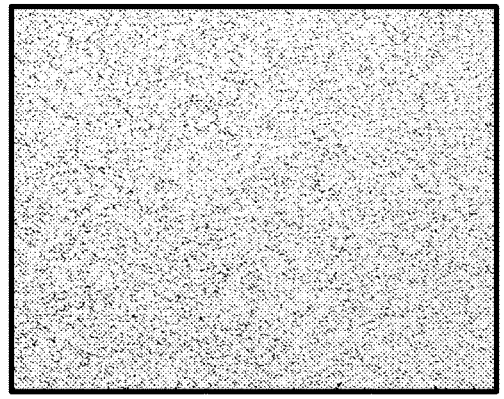
Figure 8:
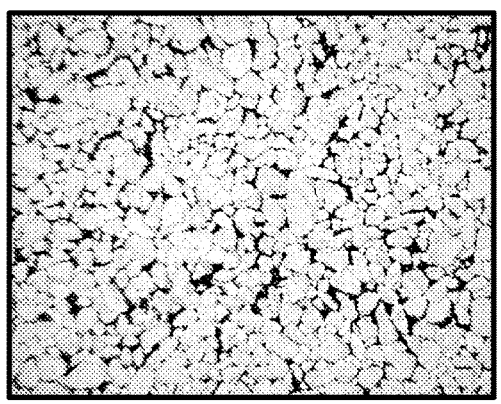
Figure 8:
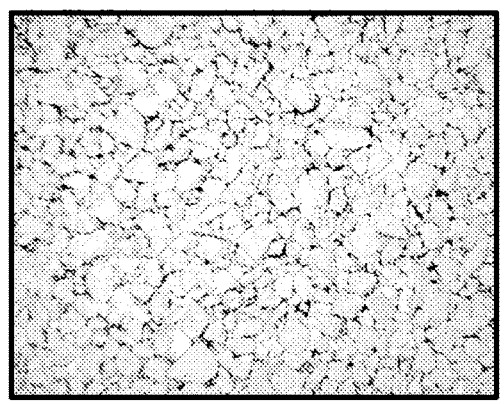

Roofing membranes with and without the reflective particles filling the gap between the granules were produced according to a typical roofing membrane manufacturing process. FIGS. 7 and 8 are side-by side photographs showing, on the left, conventional roofing products with no filling of reflective particles and, on the right, embodiments of a roofing product filled with reflective particles.

These roofing products were produced by coating a fiberglass mat with APP-modified asphalt and then roofing granules having a solar reflectance of 71% (measured by ASTM C1549 method) were deposited onto the molten asphalt running at a speed of 120 feet/minute. The resultant composite was then wound through a series of rollers to reclaim granules that were not embedded into the modified bitumen. The membrane was then cooled to a surface temperature of 160° F. prior to the application of a reflective filler. The reflective filler was of ceramic grog nature (available from CertainTeed Corp., Little Rock, Ark.) with a solar reflectance of greater than 78%. The reflective filler was then applied to the membrane by first bending the membrane to open up a gap, followed by gravity feed of the reflective particles via vibratory feeder, and them closing the gap by bending the membrane back. The resultant membrane was then pressed by press rolls at 20 psi. The setting of the press was adjusted according to the surface temperature and the run rate to maximize the adhesion of the particles and granules. For the conventional sample without the reflective particle filling, the vibratory feeder was turned off and the sample was then collected as a control case.

Table 2 lists the data of the solar reflectance from the samples obtained from the above-mentioned process.

TABLE 2

|  | Sample #1 Control - no reflective particle filling | Sample #2 Reflective particle filling with ceramic grog at 2 lb/100 ft$^2$ |
| --- | --- | --- |
| solar reflectance reading #1 | 0.66 | 0.694 |
| solar reflectance reading #2 | 0.655 | 0.695 |
| solar reflectance reading #3 | 0.643 | 0.703 |
| solar reflectance reading #4 | 0.644 | 0.703 |
| solar reflectance reading #5 | 0.662 | 0.699 |
| solar reflectance reading #6 | 0.646 | 0.728 |
| solar reflectance reading #7 | 0.653 | 0.726 |
| solar reflectance reading #8 | 0.663 | 0.717 |
| solar reflectance reading #9 | 0.651 | 0.691 |
| solar reflectance reading #10 | 0.661 | 0.704 |
| solar reflectance reading #11 | 0.659 | 0.693 |
| solar reflectance reading #12 | 0.649 | 0.693 |
| solar reflectance reading #13 | 0.659 | 0.695 |
| solar reflectance reading #14 | 0.664 | 0.687 |
| Avg. solar reflectance | 0.655 | 0.702 |

As can be seen from the data in Table 2, the reflective fillers significantly improve the solar reflectance of the membranes and also greatly enhance the visual appearance of the membrane.

In still other embodiments, a roofing product comprises a substrate having a bitumen layer; roofing granules on a majority of the bitumen layer, such that an exposed portion of the bitumen layer does not have the roofing granules; and reflective particles on the exposed portion of the bitumen layer, and the reflective particles are smaller in size than the roofing granules.

The reflective particles may have a solar reflectance of greater than 40%. The solar reflectance of the reflective particles may be greater than about 50%, greater than about 60%, or greater than about 70%. The solar reflectance of the reflective particles may be less than about 100%, less than about 90%, or less than about 80%.

The roofing granules may be on about 80% to 95% of the bitumen layer, and the reflective particles may cover substantially all of the exposed portion of the bitumen layer. The roofing product may have a solar reflectance of greater than about 70%, or greater than about 72%, or even greater than about 75%. The roofing granules may have a solar reflectance of greater than about 40%, greater than about 50%, greater than about 60%, or even greater than about 70%. The solar reflectance of the roofing granules may be less than about 75%, less than about 74%, less than about 70%, or between about 70% and about 74%.

In an embodiment, the roofing granules may have a particle size between #8 and #50 U.S. mesh. Exemplary roofing granules include roofing granules with a particle size between #10 and #40 U.S. mesh, or algae-resistant roofing granules, both available from CertainTeed Corporation of Piedmont, Missouri, USA.

The reflective particles may have a particle size less than #50 U.S. mesh. The reflective particles may have a particle size less than #100 U.S. mesh, in a range from #30 U.S. mesh to larger than #100 U.S. mesh, or from #40 to #80 U.S. mesh, or from #30 to #60 U.S. mesh.

The reflective particles may comprise at least one of crushed quartz granules, crushed calcites, ceramic particles, crushed ceramic grog, sintered clay particles, $TiO_2$ particles, infrared reflective pigments, calcined clays, zinc oxide particles, reflective polymer particles, reflective glass spheres, retro-reflective glass beads, reflective mica or thin film coated mica, heat reflective particles, metal flakes, metal particles, metal spheres and colored mineral particles. The reflective particles may further comprise at least one of an algaecide, fungicide, biocide, UV blocking, color, photocatalyst and metallic appearance.

Additional embodiments may comprise a method of fabricating a roofing shingle comprising: coating a substrate with a bitumen layer; depositing roofing granules on the bitumen layer of the substrate; pressing the roofing granules into the bitumen layer, such that an exposed portion of the bitumen layer is not covered by the roofing granules to form a subassembly; turning the subassembly on a roller such that the subassembly is curved and spaces between the roofing granules are widened; and depositing reflective particles on the widened spaces of the exposed portion of the bitumen layer. The reflective particles may be smaller than the roofing granules. Deposition of the reflective particles may occur before the roofing granules are pressed, and before cooling.

The method may further comprise pressing the reflective particles into the bitumen layer to form an assembly and cooling the assembly. The reflective particles may be deposited via gravity feed or electrostatically deposited, wherein during reflective particle deposition, the bitumen layer may face downward and the reflective particles are drawn upward to the bitumen layer. The reflective particles may be deposited before or after a first turning roller. The method may further comprise recovering at least some of the reflective particles after deposition, which may be performed via vacuum pickup or catch pan after a roller.

In still other versions, the reflective particles may be dispersed in a liquid media and then deposited. The liquid media may comprise at least one of water, latex, acrylic emulsion and a solvent-based coating. The liquid media may have an additive comprising at least one of a dispersant, viscosity modifier and biocide. In addition, the reflective particles may further comprise at least one of an algaecide, fungicide, biocide, UV blocker, color, and metallic appearance.

In yet another embodiments, a roofing product includes a substrate having a binder layer; roofing granules on a majority of the binder layer, such that an exposed portion of the binder layer does not have the roofing granules; and reflective particles on the exposed portion of the binder layer, the reflective particles are smaller in size than the roofing granules, and the reflective particles have a solar reflectance of greater than 40%.

The binder layer may comprise adhesive, acrylic, foamed acrylic, highly-filled acrylic, acrylate, alkyd, bitumen, polyester, polymer foam, epoxy, urethane, bioasphalt and a combination thereof. The binder layer may be non-bituminous. The substrate may include a metal, a fibrous web, a polymer tile, or a clay tile. The roofing granules may be on about 80% to 95% of the binder layer, and the reflective particles may cover substantially all of the exposed portion of the binder layer.

The roofing product may have a solar reflectance of greater than about 70%, or greater than about 72%, or greater than about 75%. The roofing granules may have a particle size between #8 and #50 U.S. mesh, and the reflective particles may have a particle size in a range of #30 and #100 U.S. mesh. The roofing granules may have a particle size between #10 and #40 U.S. mesh, and the reflective particles may have a particle size in a range of #40 to #60 U.S. mesh. The reflective particles may have a particle size in a range from #30 to #60 U.S. mesh. The reflective particles may have a particle size between #50 and #80 U.S. mesh.

The solar reflectance of the reflective particles may be greater than about 50%, greater than about 60%, or even greater than about 70%. The solar reflectance of the reflective particles may be less than about 100%, less than about 90%, or even less than about 80%.

The roofing granules may have a solar reflectance of greater than about 40%, greater than about 50%, greater than about 60%, or even greater than about 70%. The solar reflectance of the roofing granules may be less than about 75%, less than about 74%, or even less than about 70%. The solar reflectance of the roofing granules may be between about 70% and about 74%.

In an alternate embodiment, a method of fabricating a roofing product includes coating a substrate with a binder layer; depositing roofing granules on the binder layer of the substrate; pressing the roofing granules into the binder layer, such that an exposed portion of the binder layer is not covered by the roofing granules to form a subassembly; turning the subassembly on a roller such that the subassembly is curved and spaces between the roofing granules are widened; and depositing reflective particles on the widened spaces of the exposed portion of the binder layer, and the reflective particles are smaller than the roofing granules. Coating the substrate with a binder layer may comprise coating the substrate with a non-bituminous layer. Deposition of the reflective particles may occur before the roofing granules are pressed.

The method may further comprise pressing the reflective particles into the binder layer to form an assembly and cooling the assembly. The reflective particles may be deposited before cooling. The reflective particles may be deposited via gravity feed, or the reflective particles may be electrostatically deposited. During reflective particle deposition, the binder layer may face downward and the reflective particles may be drawn upward to the binder layer. The method may further comprise recovering at least some of the reflective particles after deposition. At least some of the reflective particles may be recovered via vacuum pickup or catch pan after a roller.

The reflective particles may be dispersed in a liquid media and then deposited. The liquid media may comprise at least one of water, latex, acrylic emulsion and a solvent-based coating. The liquid media may have an additive comprising at least one of a dispersant, viscosity modifier and biocide.

In other embodiments, the reflective particles may further comprise at least one of an algaecide, fungicide, biocide, UV blocker, color, and metallic appearance. The roofing product may be selected from the group consisting of membranes and shingles.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A roofing product, comprising:
    a substrate having a bitumen layer;
    roofing granules on a majority of the bitumen layer, such that an exposed portion of the bitumen layer does not have the roofing granules;
    reflective particles on the exposed portion of the bitumen layer, wherein the reflective particles are smaller in size than the roofing granules, the reflective particles have a solar reflectance of greater than 40%, and the reflective particles are deposited as a mono-layer having a thickness less than or equal to 500 microns and wherein the reflective particles comprise a first material and the roofing granules comprise a second material that is different from the first material; and
    the roofing granules and reflective particles provide the roofing product with a solar reflectance of greater than about 70%.

2. A roofing product according to claim 1, wherein the roofing granules are on about 80% to 95% of the bitumen layer, and the reflective particles cover substantially all of the exposed portion of the bitumen layer, such that the roofing granules and reflective particles combine to form a top layer of the roofing product.

3. A roofing product according to claim 1, wherein the solar reflectance of the reflective particles is greater than about 70% and less than about 100%.

4. A roofing product according to claim 1, wherein the reflective particles comprise at least one of crushed quartz granules, crushed calcites, ceramic particles, crushed ceramic grog, sintered clay particles, $TiO_2$ particles, infrared reflective pigments, calcined clays, ZnO particles, reflective polymer particles, reflective glass spheres, retro-reflective glass beads, reflective mica or thin film coated mica, heat reflective particles, metal flakes, metal particles, metal spheres and colored mineral particles.

5. A roofing product according to claim 1, wherein the reflective particles further comprise at least one of an algaecide, fungicide, biocide, UV blocking and photocatalyst.

6. A roofing product according to claim 1, wherein the reflective particles have an opacity greater than 50%, and a CIE color unit $L^* > 50$.

7. A roofing product, comprising:
    a substrate having a binder layer;
    roofing granules on a majority of the binder layer, such that an exposed portion of the binder layer does not have the roofing granules; and
    reflective particles on the exposed portion of the binder layer, such that the roofing granules and reflective particles combine to form a top layer of the roofing product, wherein the reflective particles are smaller in size than the roofing granules, the reflective particles have a solar reflectance of greater than 40%, and the reflective particles are deposited as a mono-layer having a thickness less than or equal to 500 microns and wherein the reflective particles comprise a first material and the roofing granules comprise a second material that is different from the first material; and
    the roofing granules and reflective particles provide the roofing product with a solar reflectance of greater than about 70%.

8. A roofing product according to claim 7, wherein the binder layer comprises at least one of an adhesive, acrylic, foamed acrylic, highly-filled acrylic, acrylate, alkyd, bitumen, polyester, polymer foam, epoxy, urethane, and bioasphalt.

9. A roofing product according to claim 7, wherein the binder layer is non-bituminous.

10. A roofing product according to claim 7, wherein the substrate comprises a metal, a fibrous web, a polymer tile, or a clay tile.

* * * * *